UNITED STATES PATENT OFFICE.

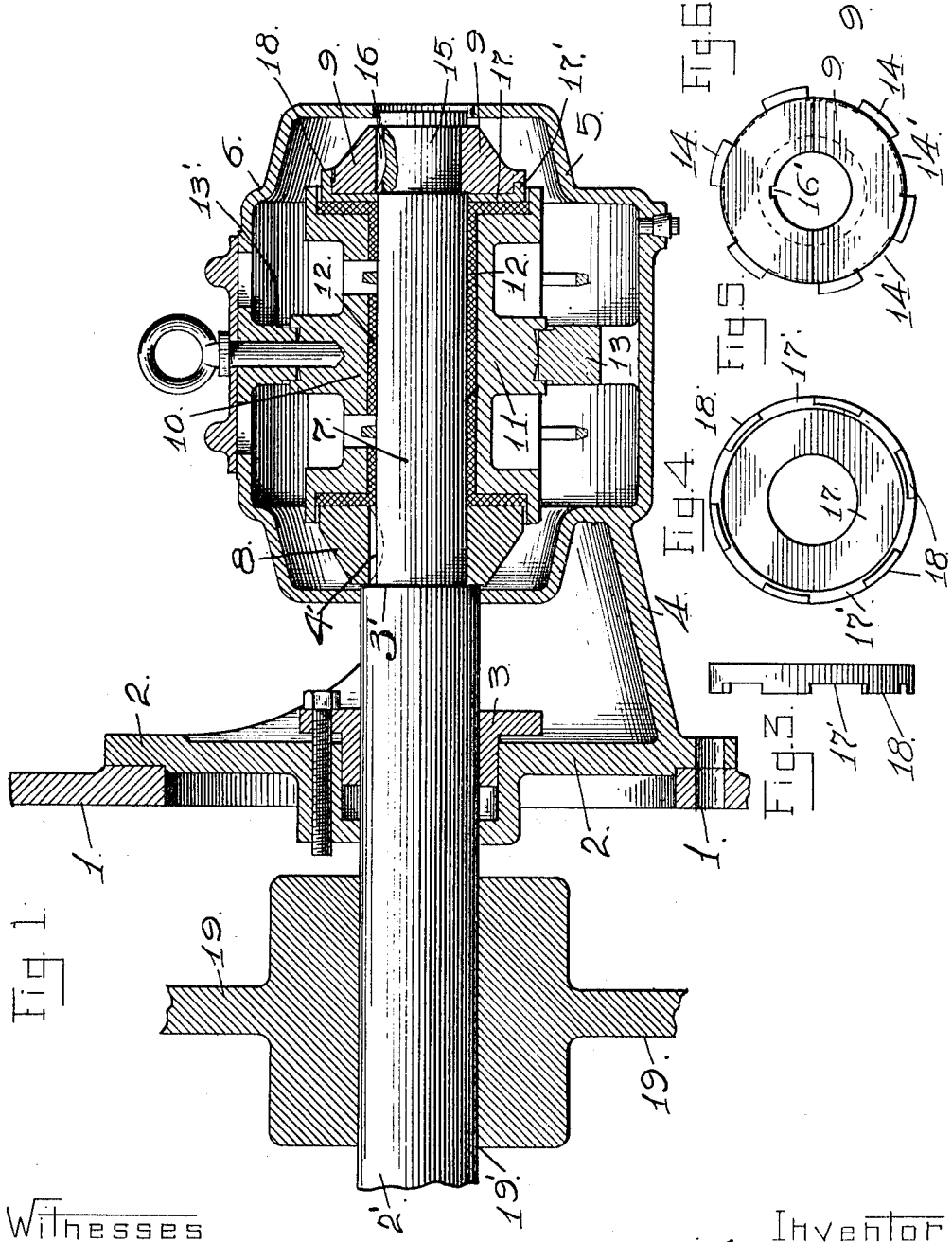

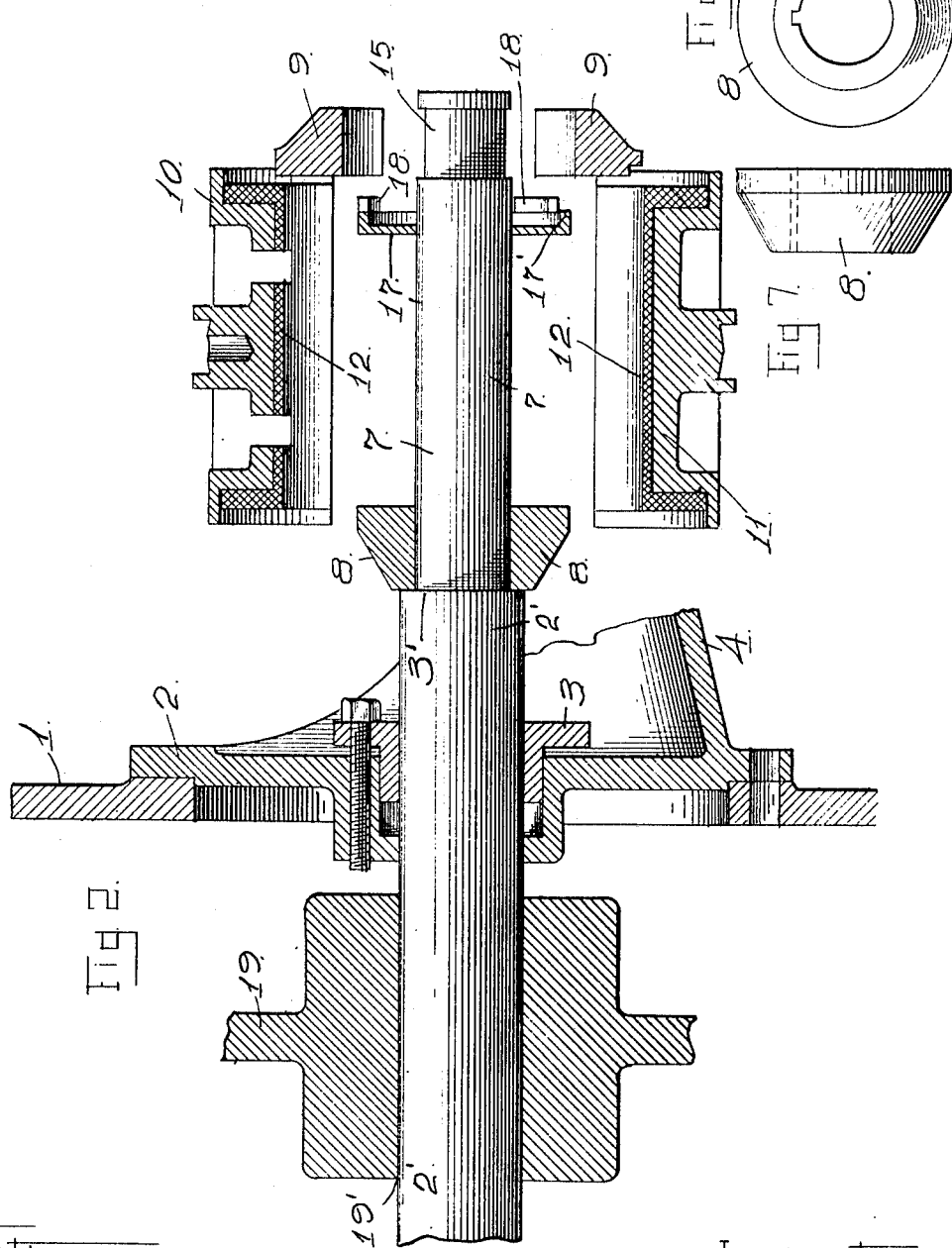

GEORGE J. HENRY, JR., OF SAN FRANCISCO, CALIFORNIA.

THRUST-BEARING.

1,020,552.     Specification of Letters Patent.     Patented Mar. 19, 1912.

Application filed August 7, 1911. Serial No. 642,694.

*To all whom it may concern:*

Be it known that I, GEORGE J. HENRY, Jr., a citizen of the United States, residing in the city and county of San Francisco and State of California, have invented certain new and useful Improvements in Thrust-Bearings, of which the following is a specification.

The present invention relates to an improved constructed thrust bearing for runners of turbines, of such construction as to permit of the thrust collars being quickly detached from the sustaining shaft of the turbine in order that the turbine runner may be easily and quickly removed therefrom, for any desired purpose.

Ordinarily, the thrust collars are formed integral with the turbine shaft for the runners, consequently it is required that the runner or blade fitted onto the said shaft be formed with a hub opening sufficiently large in diameter to permit of the same clearing the thrust collars as slipped onto and off the said shaft, which necessitates a built up bearing hub being formed on the runner shaft in order to fill in the space existing between the central aperture of the runner and the surface of the runner shaft, due to the diameter of said central opening or aperture being considerably greater than that of the said shaft. This large central shaft opening tends to weaken the runners or blades of the turbine, while the built up bearing hub connection between the shaft and runners is not only an expensive form of connection, but is likewise a form of connection lacking in rigidity, and the formation of the thrust collars integral with the runner shaft is an expense which adds, materially to the cost and to the production thereof.

The object of the present invention is to dispose of the integral thrust collars, providing removable collars in lieu thereof, and obviate the necessity of the built up bearing hub connection between the runner and the shaft sustaining the same, thereby materially reducing the expense incident to the production of the turbine, securing a substantially rigid and direct connection between the runner of the turbine and the turbine shaft, and at the same time providing for the quick and easy removal of the runners from the sustaining shaft.

To comprehend the invention reference should be had to the accompanying sheets of drawings, wherein—

Figure 1 is a longitudinal sectional view of the outboard bearing for the turbine shaft, with one of the turbine runners partly broken away and sectioned, illustrating the thrust collars within the bearing. Fig. 2 is a similar view illustrating the bearing casing removed and the bearing blocks separated from the turbine shaft, also the outer sectionized thrust collar freed from the said shaft, the locking wear ring for said thrust collar being illustrated as slipped inwardly onto the turbine or runner shaft for the release of the sectionized thrust collar therefrom. Fig. 3 is an edge view of the locking wear collar. Fig. 4 is a view in front elevation of the said wear collar. Fig. 5 is a similar view of the sectionized thrust collar. Fig. 6 is an edge view of the said collar. Fig. 7 is a similar view of the solid thrust collar. Fig. 8 is a view in front elevation of the said collar.

In the drawings, the numeral 1 is used to designate one of the side plates for the housing of the turbine, 2 a removable section for the said plate, 2′ a sustaining shaft on which the turbine runners are mounted, the said shaft extending through a stuffing gland 3, and 4 a supporting bracket projected from the removable plate 2 of the housing, not shown, and sustaining the outboard bearing casing 5, which is closed by the removable cap or cover section 6. Within the said bearing casing is extended the projected end of the runner shaft, on the reduced portion 7 of which the thrust bearing collars 8 and 9 are fitted, the same being held spaced by the bearing blocks 10 and 11 which embrace the said reduced portion of the runner shaft and are held in position by the bearing casing 5, the said bearing block being provided with the usual Babbitt metal lining 12, which bears on the surface of the runner shaft and the faces of the bearing thrust collars. As usual in this construction of bearing boxes, the bearing blocks are held in position relative to the runner shaft by means of the circumferentially disposed ribs 13 and 13′ inwardly projecting from the bearing casing 5 and the removable cap section 6 thereof.

The thrust collar 9 is a sectionized one, *i. e.* made in two sections, and on the periphery of the same a series of circumferentially disposed projections 14 are formed, which provide a series of peripheral seats 14', (Figs. 5 and 6 of the drawings). This collar fits within an annular groove 15 cut in the end of the runner shaft 2', being secured therein by means of a key 16 which engages with the key seat 16' in one section of the collar 9, and the sections of the said collar are held together by means of a lock-ring 17, the flange 17' of which embraces the periphery of the collar 9, and the fingers or lugs 18 projecting therefrom fit within the seats 14' of the said collar to interlock therewith, to prevent circumferential displacement, the collar when thus united to the runner shaft being held against endwise movement by the walls of the annular groove 15 within which the collar fits when the sections are brought together and keyed to the said shaft. The lock-ring 17 is fitted onto the runner shaft in advance of the sectionized bearing thrust collar 9 and serves as a wear surface therefor.

In assembling the parts mentioned, the solid thrust collar 8 is slipped onto the reduced end of the runner shaft until the same abuts against the shoulder 3', being held to the shaft by a key 4', after which the lock-ring 17 is slipped onto the outer end of the shaft a distance to clear the sphere of the annular groove 15, the sections of the thrust bearing collar 9 being then fitted within the said annular groove 15 of the runner shaft 2', placing the key 16 into the key seat 16' of the upper section of the said collar. The lock-ring 17 is then moved outwardly until the flange 17' thereof partly overlaps the periphery of the thrust bearing collar 9 and the fingers or lugs 18 thereof engage or interlock with the peripheral seats 14' of the said collar in order to hold the sections in adjusted position. The semi-circular bearing blocks 10 and 11 are then positioned onto the runner shaft to hold the thrust bearing collars properly spaced apart and against endwise movement, after which the cap or upper section 6 of the bearing casing 5 is secured thereto to close the same.

It will be understood that the turbine runner 19 is keyed onto the runner shaft within the casing for the turbine.

Under the described construction of the thrust bearing blocks and the manner of detachably mounting the same on the runner shaft, the shaft opening 19' of the runner is not required to be of a diameter greater than will suffice to permit of the runner shaft passing freely therethrough, hence when the runner is keyed to said shaft there is a direct and substantially rigid connection between the said parts.

To remove the runner from within the turbine casing, for any reason whatsoever, the cap or cover section 6 of the casing 5 is removed for access to the interior thereof, after which the sections 10 and 11 of the bearing blocks are removed. The lock ring 17 is then slipped inwardly for a slight distance to free the thrust bearing collar 9, Fig. 2 of the drawings, which is then removed from within the casing 5, after which the lock ring 17 and the solid thrust bearing collar 8 are slipped off of the runner shaft. By detaching the end plate 1 from the turbine casing and removing the same from off the runner shaft, the runner 19 is free to be slipped from the said shaft on the removal of the securing key uniting the same to the shaft. It will thus be noted that the shaft openings are not required to be of a diameter greater than will permit of the runner shaft passing freely therethrough, and the expensive machine work required to properly turn the runner shaft to form the thrust bearing collars integral therewith is eliminated.

The essential feature of the present invention resides in the means for detachably uniting the thrust bearing collars to the runner shaft, whereby the shaft opening of the turbine runner is not required to be of a diameter greater than will permit of the runner shaft passing freely through the same, and the turbine runner may be keyed direct to the said shaft.

While the invention has been described for use in connection with turbine mechanism, I do not wish to be understood as confining the same thereto.

Having thus described the invention what is claimed as new and desired to be protected by Letters Patent is—

1. In a thrust bearing for the described purpose, the combination with a sustaining shaft, of separable bearing blocks held thereon, a solid thrust bearing collar slidably mounted on said shaft and against which the inner end of the bearing blocks bear, a separable thrust bearing collar keyed to the outer end of the sustaining shaft, and a lock ring interposed between the inner face of the said collar and the outer end of the bearing blocks, said ring interlocking with the separable thrust bearing collar for holding the same in position relative to the sustaining shaft.

2. In a thrust bearing for the described purpose, the combination with a sustaining shaft, of bearing blocks detachably held thereto, a separable thrust bearing collar keyed to the outer end of the shaft, a lock ring interposed between the said collar and the outer end of the bearing blocks and slidable on the sustaining shaft, the said lock-ring carrying means for moving into locked engagement with the separable thrust bearing collar.

3. In a thrust bearing for the described purpose, the combination with an outer separable thrust bearing collar provided with a series of peripheral seats, of a lock ring provided with a plurality of laterally projecting lugs for moving into locked engagement with the mentioned seats of the thrust bearing collar, the said lock ring when in locked engagement with the bearing collar forming an inner bearing surface therefor.

4. In a thrust bearing for the described purpose, the combination with a separable thrust bearing collar provided with a plurality of circumferentially disposed seats, of a lock ring provided with a plurality of laterally projecting lugs for engagement with the mentioned seats of the thrust collar, the said lock ring when in locked engagement with the bearing collar forming an inner bearing surface therefor.

5. In a thrust bearing for the described purpose, the combination with a bearing casing provided with a removable cover or cap section, of a sustaining shaft having a reduced portion extended through the casing and provided in its outer end with an annular groove, an inner thrust bearing collar slidable on the shaft within the casing, a separable thrust bearing collar fitted in the said annular groove of the sustaining shaft and secured thereto, the said collar being provided with a plurality of circumferentially disposed seats, a lock-ring slidable on the sustaining shaft and provided with means for engaging with the seats of the separable thrust bearing collar for holding the same in position relative to the shaft, the said lock ring forming an inner wear surface for the mentioned collar, and separable bearing blocks held to the shaft within the bearing casing, the said blocks holding the thrust bearing collars spaced apart.

6. The combination with a turbine casing, of a turbine or sustaining shaft extended therethrough and provided in its outer end with an annular groove, a bearing sustaining plate removably held to the end wall of the turbine casing, a bearing casing supported thereby and through which the reduced end of the sustaining shaft extends, an inner solid thrust bearing collar slidable on the said shaft, a separable thrust collar secured within the annular groove of the sustaining shaft, a lock ring slidably mounted on the shaft for locked engagement with the separable collar to hold the same in position relative to the sustaining shaft and to form an inner wear surface for the said collar, and separable bearing blocks held to the shaft within the casing for holding the thrust bearing collars spaced apart.

7. In a bearing for the described purpose, the combination with a sustaining shaft provided with a reduced extension, of a bearing casing through which said extension projects, an inner solid slidable thrust bearing collar keyed to said shaft, a separable thrust bearing collar keyed to the outer end portion of the shaft, a lock-ring slidable on the shaft for moving into locked engagement with the separable thrust bearing collar to hold the same positioned relative to the shaft and form an inner wear surface therefor, and means removably secured within the bearing casing for holding the thrust bearing collars spaced apart.

In testimony whereof I have signed my name to this specification in the presence of two subscribing witnesses.

GEORGE J. HENRY, Jr.

Witnesses:
N. A. ACKER,
D. B. RICHARDS.